(12) United States Patent
Meadows et al.

(10) Patent No.: US 7,992,161 B2
(45) Date of Patent: Aug. 2, 2011

(54) METHOD AND APPARATUS FOR PROVIDING INCENTIVES FOR VIEWERS TO WATCH COMMERCIAL ADVERTISEMENTS

(75) Inventors: Vernon Meadows, Lilburn, GA (US); James M. Rogers, Redwood City, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1475 days.

(21) Appl. No.: 09/861,595

(22) Filed: May 22, 2001

(65) Prior Publication Data
US 2004/0255322 A1 Dec. 16, 2004

(51) Int. Cl.
*H04N 7/16* (2011.01)
*H04H 60/33* (2008.01)
*H04H 20/14* (2008.01)
(52) U.S. Cl. ............... 725/23; 725/22; 725/13; 725/139
(58) Field of Classification Search ............... 725/23, 725/34, 8, 22, 24; 705/14
See application file for complete search history.

(56) References Cited

U.S. PATENT DOCUMENTS

| | | | | |
|---|---|---|---|---|
| 5,855,008 A * | 12/1998 | Goldhaber et al. | | 705/14 |
| 5,929,849 A * | 7/1999 | Kikinis | | 725/113 |
| 6,057,872 A * | 5/2000 | Candelore | | 725/23 |
| 6,282,713 B1 * | 8/2001 | Kitsukawa et al. | | 725/36 |
| 6,513,160 B2 * | 1/2003 | Dureau | | 725/9 |
| 6,678,890 B1 * | 1/2004 | Cai | | 725/24 |
| 6,681,393 B1 * | 1/2004 | Bauminger et al. | | 725/23 |
| 6,766,524 B1 * | 7/2004 | Matheny et al. | | 725/23 |
| 7,389,522 B1 * | 6/2008 | Shintani | | 725/8 |
| 7,493,636 B2 * | 2/2009 | Kitsukawa et al. | | 725/23 |
| 2002/0100055 A1 * | 7/2002 | Zeidman | | 725/110 |
| 2002/0108125 A1 * | 8/2002 | Joao | | 725/139 |
| 2002/0133817 A1 * | 9/2002 | Markel | | 725/23 |
| 2004/0205810 A1 * | 10/2004 | Matheny et al. | | 725/23 |
| 2005/0015796 A1 * | 1/2005 | Bruckner et al. | | 725/32 |
| 2005/0097594 A1 * | 5/2005 | O'Donnell et al. | | 725/15 |
| 2005/0283797 A1 * | 12/2005 | Eldering et al. | | 725/35 |
| 2006/0288363 A1 * | 12/2006 | Kunkel et al. | | 725/34 |

* cited by examiner

*Primary Examiner* — William Trost, IV
*Assistant Examiner* — Chris Parry
(74) *Attorney, Agent, or Firm* — Scott P. Zimmerman PLLC (57) ABSTRACT

A user is prompted during television commercial breaks to depress one or more pushbuttons on a television remote control at certain times to confirm that the user is watching the advertisements. A set top box connected to the television receives and decodes the signal from the remote control. When the user responds properly to a prompt, the set top box increments a tally maintained in the set top box memory to accumulate points by which the user can earn rewards.

9 Claims, 5 Drawing Sheets

METHOD AND APPARATUS FOR PROVIDING INCENTIVES FOR VIEWERS TO WATCH COMMERCIAL ADVERTISEMENTS

FIELD OF THE INVENTION

The present invention relates to a set top box apparatus for tracking television viewing activities, and more particularly, to a method and apparatus for providing incentives for viewers to watch television advertisements.

DESCRIPTION OF THE RELATED ART

Since the origin of home television in the 1940's, the primary source of revenue for television networks has been paid advertisements that are interspersed between television programming of entertainment or news information as "commercials" for products and services. Typically 15 to 60 seconds in length, television commercials are grouped together as pre-defined breaks in the broadcast of a television show, occurring after every few minutes of television programming. Every one hour of television programming typically has approximately sixteen (16) minutes of commercials. The number of commercials and the timing between placement of the commercials are often dependent upon the type of television show (i.e., sporting event, game show, movie, or sitcom) or the format of the program (i.e., live or pre-recorded). For many advertisers, television commercial advertising is a primary avenue for promoting products and services to potential customers.

Television advertising is generally more effective when aired during popular television programs that are watched by many viewers who are interested in buying the types of products or services that are advertised. In determining whether a television program may be appropriate for particular advertisements, advertisers typically consider whether the program attracts large numbers of viewers who are in the same age group, gender, and income level, and have similar interests with those who tend to purchase the products to be advertised. Selecting the placement of advertising in this manner increases the likelihood that viewers who watch the advertisement will be interested in or may otherwise influence household purchasing decisions concerning products advertised during the program.

Although advertisements are selected for television programs that are likely to be watched by consumers who might be interested in the advertised products or services, these advertisements are ineffective if they are not actually watched by consumers. For example, during commercial breaks, television viewers often change television stations to temporarily switch to another television program, chat with others during the commercial break, or otherwise divert their attention from the aired commercials until the television program resumes. Those who pre-record television programs using video cassette recorders ("VCRs") or television "replay" systems ("TiVO") can quickly fast-forward through commercial breaks to bypass the aired commercials altogether.

Using presently available market research tools, broadcast networks and advertisers can estimate how many households are watching particular television programs and advertisements. For example, the AC Nielsen™ ratings system tracks television viewing activities in a sampling of households, and by extrapolation it can estimate the number of viewers for different television shows across the country. Advertisers use market research companies to conduct focus group interviews and study the effectiveness of different types of television advertisements. These techniques may assist advertisers in creating more effective advertising campaigns and selecting appropriate television programs during which to advertise. However, market research can only provide survey estimates based upon a small sampling of the general public, and cannot ascertain whether viewers are actually watching an advertiser's television commercials during television programming.

Television advertisements often include recognizable jingles or slogans or comical themes to entice consumers to watch the commercials. However, without an incentive to watch the commercials, consumers are likely to disregard the majority of television advertisements that occur during a television program. Even when consumers watch the television advertisements, they are more likely to remember the jingle or comical aspects of a commercial than its corporate, promotional message.

Accordingly, there is a need for a method and system for tracking television commercial viewing habits in households, to provide incentives for consumers to watch television commercials, and to increase the effectiveness of television commercial advertising.

SUMMARY OF THE INVENTION

In view of the difficulties described above, there is a need for a method and system to provide an incentive for viewers to watch television commercial advertisements during television programming. In a first embodiment, a user is prompted during commercial breaks to depress one or more pushbuttons on the television remote control at certain times to confirm that the user is watching the advertisements. A set top box connected to the television receives and decodes the signal from the remote control. When the user responds properly to a prompt, the set top box increments a tally maintained in the set top box memory to accumulate points by which the user can earn rewards.

In a second embodiment, the user depresses a pushbutton on the television remote control during commercial breaks when the user is interested in the subject matter discussed in a commercial. When either the television program ends or the user desires to stop watching television, the system retrieves a questionnaire or interactive video for each selected advertisement, which corresponds to the selected advertisements. By completing a questionnaire or interactive video, the user can then either accumulate points for rewards or receive coupons for the selected advertisements.

A third embodiment provides a method for subsidizing the cost of a pay-per-view video movie or another television program by providing one or more questionnaires or interactive videos before the desired program is to be transmitted. The set top box maintains a directory of commercial advertisers and a history of the questionnaires that were previously provided, and prompts the user through an interactive dialog to select one or more interactive commercial advertisements that would be of interest to the user. After the user completes selected questionnaires or interactive videos, the desired program is then provided by the broadcast network. As an alternative, the set top box may also print coupons that correspond the selected advertisements.

An object of the present invention is to provide a method for providing an incentive for a viewer to watch commercial advertisements displayed during network programming. Prompts are provided during commercial breaks for a viewer to provide an indicated response within an indicated time period. Viewer responses to the prompts are detected, and a point tally is increased when the viewer provides the indicated response within the indicated time period, such that the viewer can receive a reward when the tally reaches a certain number of points.

It is also an object of the present invention to provide a method for providing advertisement information selected by a viewer. Prompts are received from the viewer during commercial breaks in television programming to select commercial advertisements of interest to the viewer. When a prompt is received from the viewer to receive additional information relating to the selected commercial advertisements, additional advertisement information relating to at least one of the selected commercial advertisements is provided. A reward is provided to the viewer for reviewing additional advertisement information.

It is a further object of the present invention to provide a method for providing advertisement information selected by a viewer. The viewer is prompted to select from a plurality of categories of products or services. Selections are received from the viewer in response to prompts to identify a particular category of products or services of interest. Advertisement information relating to at least one of the products or services in the selected category is provided, and a discount for television programming is provided as a reward to the viewer for reviewing the selected advertisement information.

DETAILED DESCRIPTION OF THE PREFERRED EMBODIMENTS

The present invention provides a set top box for a cable television or satellite television system that stores files in a local memory containing questionnaires, interactive videos, or other information relating to commercial advertisements that are broadcast over a television network. By responding to prompts during commercial breaks or by completing questionnaires or participating in interactive videos before or after a television program, users earn points that can be redeemed for prizes and rewards to provide an incentive for the users to watch television commercials.

Figure 1:
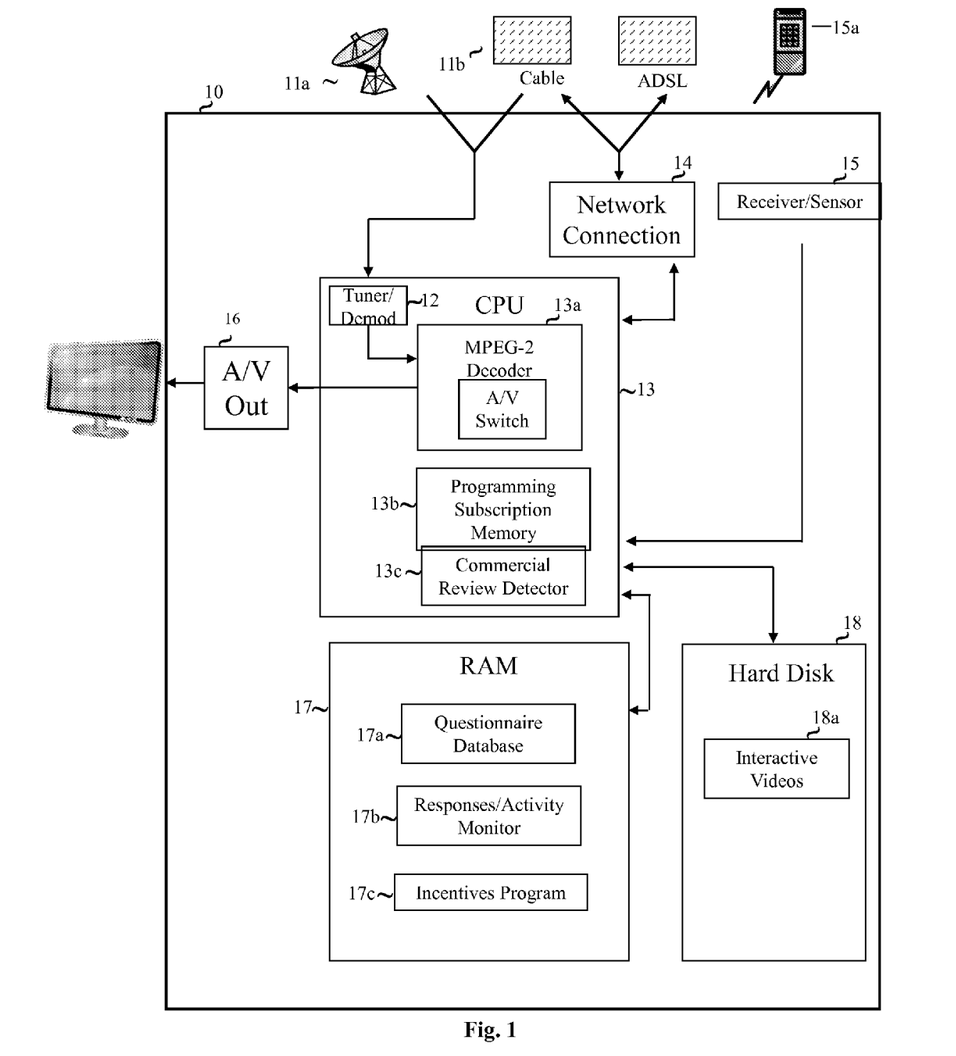
FIG. 1 is a schematic diagram of a set top box according to a preferred embodiment of the present invention.

The present invention will now be described in more detail with reference to the figures. FIG. 1 is a schematic diagram of a set top box 10 according to the preferred embodiment of the present invention. The set top box receives encoded television signals either from satellite receiver 11a or cable feed line 11b, which is fed to a tuner/demodulator 12 for receiving digital signals. The tuner/demodulator 12 tunes to the frequency of a broadcast stream that is selected by a user. The tuner/demodulator 12 feeds into an MPEG-2 decoder 13a in a central processing unit 13 in set top box 10. The tuner 12 tunes to the frequency of a selected MPEG-2 transport stream, which is then decoded in the MPEG-2 decoder 13a and fed to the television.

Programming subscription memory 13b in CPU 13 maintains a list of television stations that are available to the viewer in accordance with the subscription plan arranged by the user of the set top box. In order to select a channel, CPU 13 receives signals from a remote control 15a via remote control sensor 15. The selected signal is decoded and divided into stereo audio and video signals, which are fed to the television via audio and video line out jacks 16.

Set top box 10 also includes a network connection/modem 14, by which the box 10 can transmit and receive data from the cable or satellite television system provider. The preferred network connection is an ADSL modem. Other upstream transmission devices are also possible, such as a DOCSIS cable modem or a 56 k baud modem over a telephone line. In known satellite television systems, the set top box initiates a call to the satellite system service provider to provide billing information and to credit the user's account for pay-per-view or movie-on-demand requests and transactions. As will be described below, a telephone modem also can be used in the present invention to receive questionnaires and interactive videos, or to send incentive tally information to an external "awards" network to provide awards to a user for watching television commercials and/or providing feedback regarding the commercials. An ADSL line is preferred to a presently available 56 k baud modem because of the reduced upload and download time.

Set top box 10 of the present invention additionally includes television commercial review detector 13c. Detector 13c receives responses from a television viewer who is utilizing the incentives system of the present invention as described below, via remote control 15a and receiver/sensor 15. RAM 17 stores files accessed by CPU 13 during operation of the incentives system, such as questionnaire database 17a, responses/activity monitor 17b, and incentives program 17c. Memory intensive files are stored in hard disk 18, such as interactive advertiser videos 18a.

Operation of the incentives system according to the first embodiment of the present invention is now described with reference to FIG. 2. In this embodiment, a user is periodically prompted during television commercials to enter specified codes on the user's remote control unit. When the system detects that the user has entered the proper code in response to a prompt, a tally is incremented in the television set top box memory. In this manner, the system is checking whether the user is actually watching the television commercials. As the tally accumulates points, the user becomes eligible for discounts or prizes from the network, thereby providing an incentive for the user to watch the broadcast television commercials.

Figure 2:
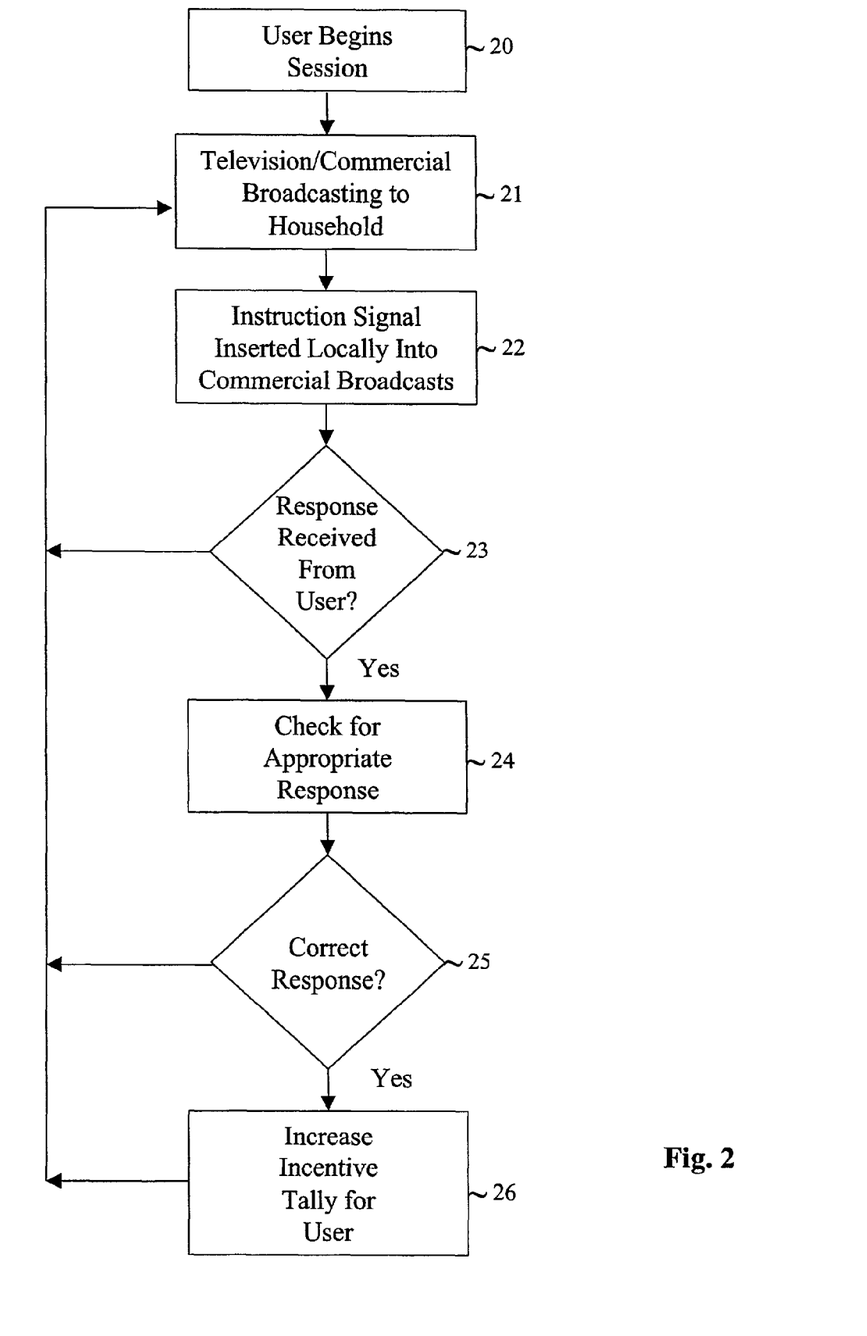
FIG. 2 is a flow diagram for prompting a user during commercial advertisements and monitoring user responses using the set top box of FIG. 1 according to the preferred embodiment of the present invention.

A user indicates that he/she wishes to initiate a session with the incentive system in step 20 of FIG. 2. The user's remote control may include a dedicated "incentives program" pushbutton, or the user may depress one or a series of pushbuttons in response to a prompt that is either displayed on the television or set top box system, or heard as an audio clip on the television speakers. The user may also be required to identify himself/herself to distinguish between different members of a household. Alternatively, the television system may be configured to automatically begin a new session or continue an existing session each time that a television is turned on.

As a new session begins, television broadcasting is provided to a household television through a set top box, in step 21. As described in FIG. 1, the user can access television stations included in the user's programming subscription via a remote controller unit. Television commercials are intermittently displayed on the television during television commercial breaks from television programming. During the broadcasting of television commercials, instruction signals or prompts are provided to the user on either the set top box or the television display, in step 22. The set top box may provide a display that prompts the user to press one or more pushbuttons at certain times during television commercials. However, in the preferred embodiment, the set top box may locally insert this instruction, either through audio, video, or a combination of both, onto the television display itself, during or after the commercial. As another possibility, the television broadcasting network may incorporate such instruction signals directly into the television broadcast of commercials.

The set top box 10 of FIG. 1 detects if a response to a prompt is received through IR receiver/sensor 15 via Commercial Review Detector 13c, in step 23. If the user presses a pushbutton during the commercial break, the set top box analyzes the user's response in step 24. The user may use a remote controller unit for any of several purposes, such as to change television channels, adjust the television volume, create a picture-in-picture display, etc. Although there may be one or more dedicated pushbuttons on the remote control for responding to television commercial prompts, it is also possible that the incentives system utilizes some remote control pushbuttons for multiple purposes. For example, a television prompt during a commercial break may read, "Please press '*' followed by '756' during this commercial."

The system checks in step 24 whether the user presses the appropriate keys on the remote control in response to a television commercial prompt. The particular configuration of the checker system depends upon whether the prompt is generated locally in the set top box or regionally by the broadcast network. For example, if the prompt is generated by the set top box for local insertion into the television display, then responses/activity monitor 17b detects whether the user responds within a certain number of seconds after the set top box 10 generated the prompt. However, if the prompt is broadcast by the television network, then responses/activity monitor 17b may periodically download codes and acceptable response timing information via the network connection 14 from the television network. In such case, the set top box maintains a database of remote controller codes and corresponding time periods when the codes are to be transmitted by a user.

If a response is not received in the set top box, the system in step 25 continues the broadcasting of television programming in step 21 in the normal fashion. However, if the user provides the appropriate response within the proper timing, then the system increases a tally in a database in the set top box, in step 26. Set top box 10 can be configured to maintain either a separate tally count for each individual user or a combined tally count for all users in the household.

Figure 3:
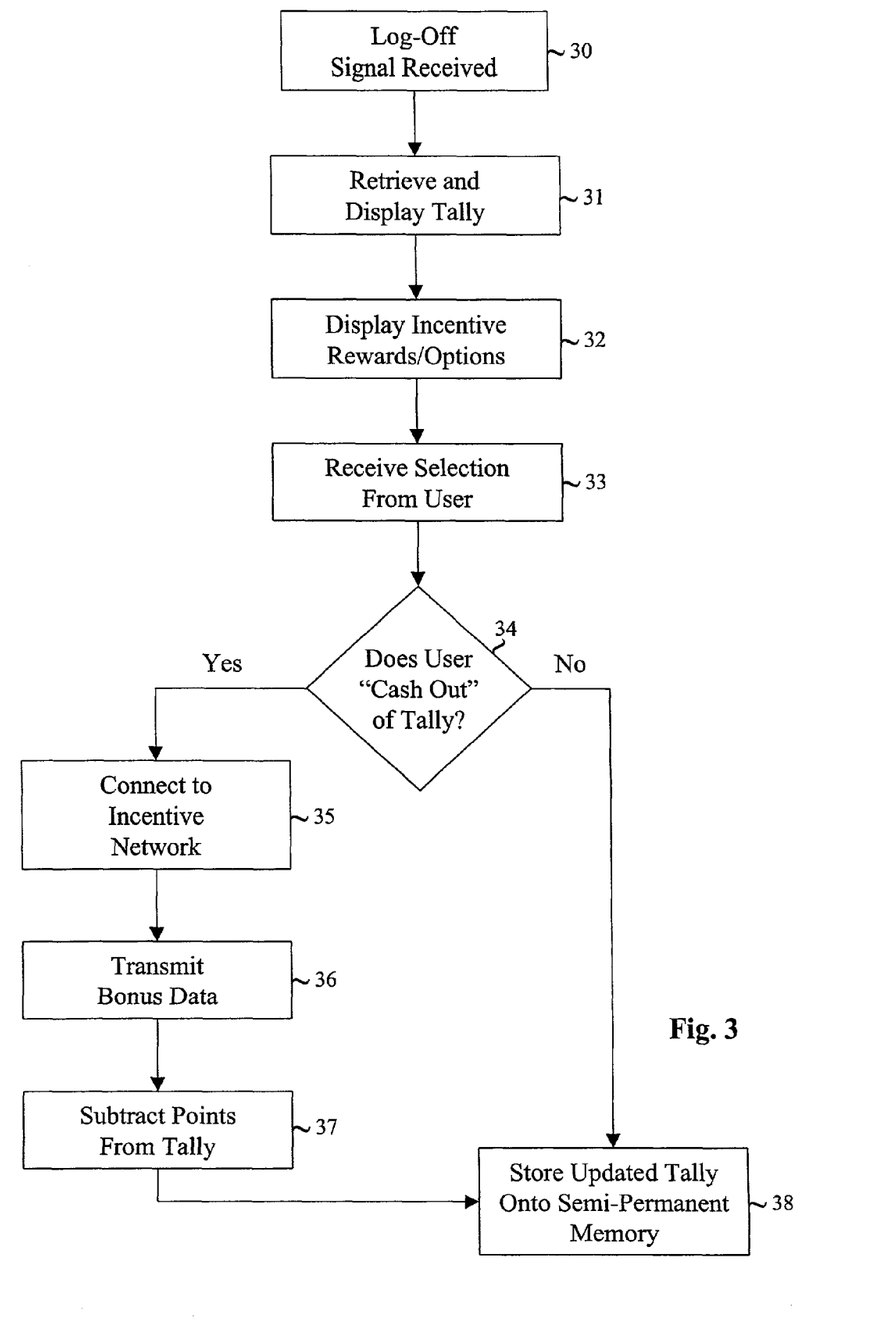
FIG. 3 is a flow diagram for providing incentives to a user to watch television commercials using the set top box of FIG. 1, through a tally system according to the present invention.

FIG. 3 is a flow diagram that illustrates the steps for logging out of a session and redeeming earned points for a prize or discount. Upon receiving a signal that the user desires to log off, in step 30, the system retrieves and displays the tally for the incentive system, stored in RAM 17 of set top box 10, in step 31. The system then retrieves the user's account information from incentives program 17c in RAM 17 and displays a description of the rewards that are available to the user based upon the number of accumulated points, in step 32. The system then waits to receive a selection based upon the displayed choices, in step 33.

If the system detects in step 34 an indication that the user desires to redeem the accumulated points for a reward, then the set top box connects to an external network in step 35, via network connection 14 in set top box 10. The operation of the external network may be sponsored by the digital satellite network or the cable television provider. Alternatively, the external network may be operated by a separate market research company affiliated with the digital satellite or cable television provider. The set top box 10 then transmits the user's identification and bonus data to the external network in step 36. The tally information in the set top box 10 is then reduced by the number of points that were redeemed, in step 37, and the remainder is stored in semi-permanent memory in step 38.

To entice viewers to watch television commercials, the incentive system can provide a variety of different types of awards, such as credits or discounts for pay-per-view movies or programs, advertised products, satellite television or cable television monthly service fees or frequent flyer miles.

If in step 34 the user has decided not to redeem the accumulated points at this time, the user's tally is stored onto semi-permanent memory, such as the hard disk 18 on set top box 10, in step 38. The user can then continue to accumulate points for rewards upon subsequent uses of the incentives system.

In a second embodiment of the present invention, users press a code or indicator on a remote control unit during commercial breaks in television programming to select to receive further information concerning commercial advertisements of interest. When the user desires to stop watching television programs, the system presents questionnaires or interactive videos pertaining to those television commercials selected by the user. The questionnaires or interactive videos are locally inserted as a multi-media presentation on the user's television. The user is then rewarded for completing a questionnaire or interactive video by receiving discount coupons for the advertised products or credits for pay-per-view service.

As in the first embodiment as described in reference to FIG. 2, the incentives system prompts the user during commercial breaks. In this case, the user presses the "incentive system" pushbutton on the user's remote control unit in response to the prompt or the code in order to select and mark the commercial as being of interest to the user. Upon selecting a commercial, the set top box displays a short confirmation message either on the set top box itself or on the television display. The user may have a limited opportunity to then cancel a selection made in error.

Figure 4:
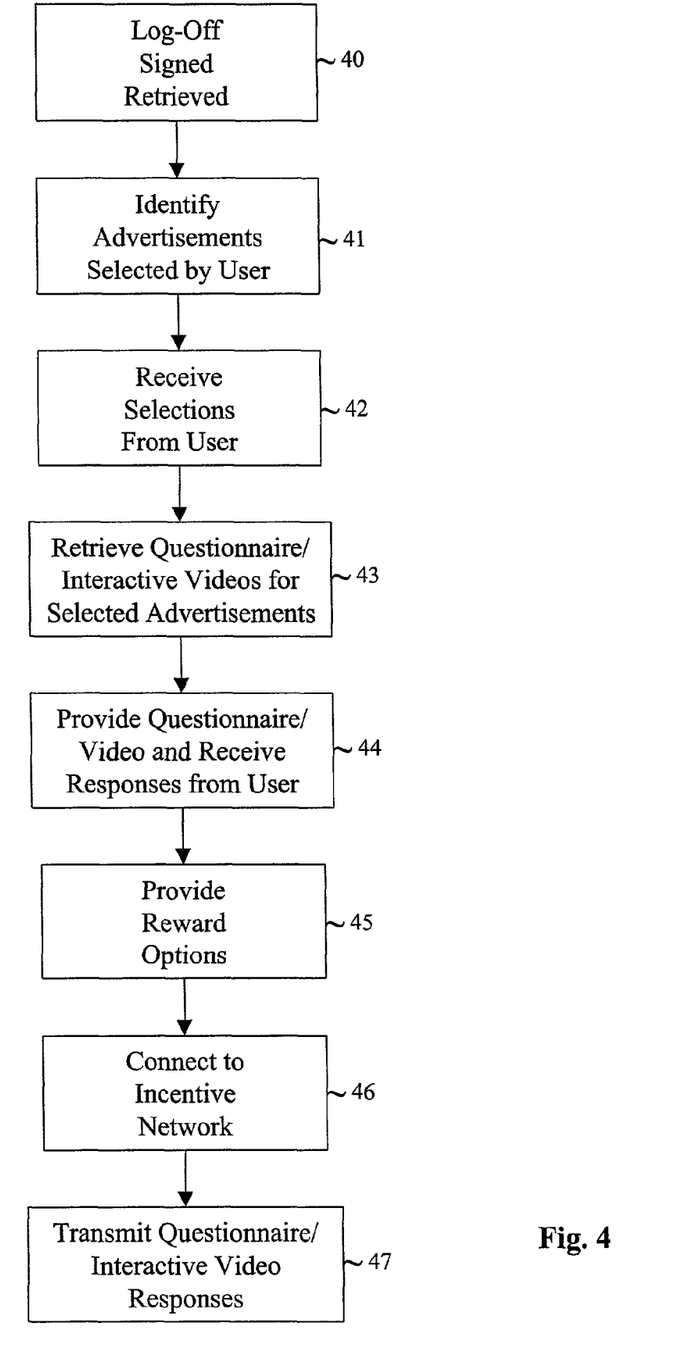
FIG. 4 is a flow diagram for providing questionnaires or interactive videos to a viewer using the system of FIG. 1 after selecting commercials of interest provided during television broadcasting.

FIG. 4 is a flow diagram that illustrates the steps for logging out of a session, providing questionnaire or interactive videos, and redeeming earned points for a prize or discount. In step 40, the set top box receives a log-off signal from the user. The user may log-off at the end of a program, or at any time during television programming, but the user should anticipate that the questionnaire or interactive video will last a few minutes after the user logged off.

After the user logs off, the A/V switch in the MPEG-2 Decoder 13a of CPU 13 disconnects the television from television broadcast programming. A screen from the incentives program database 17c in RAM 17 then displays a list of the advertisement sponsors that were selected by the user during the session, in step 41. This list may include the name of each selected sponsor or the sponsor's corresponding advertised product. The user can then select one or more of the advertisements about which the user wishes to receive further information, in step 42. Alternatively, the user additionally may be able to navigate through selections of products or services offered by the selected advertisement sponsors to choose a product that is of primary interest to the user.

Once the selections are made, the set top box retrieves the relevant questionnaire or interactive video concerning a selected advertiser or the advertiser's product or service from the questionnaire database 17*a* or the interactive videos memory 18*a*, in step 43. The questionnaire or video is then decoded in MPEG-2 Decoder 13*a* and output through A/V line out 16 to the user's television, in step 44. The user then completes the questionnaire or video. If the user had indicated an interest in multiple advertisers or products, the system may provide a plurality of questionnaires for the viewer to complete.

When the questionnaires or interactive videos are completed, the system then provides award options to the user in step 45. Although the user may opt to receive a credit or discount from a pay-per-view movie or program, as described above, the system may also offer discounts for those products that are featured in the questionnaire or interactive video completed by the user. The user may receive a discount or coupon from a printer that may be connected to or integrated with the set top box 10.

As another option to increase the effectiveness of advertising, the system may electronically transmit a user's discount through the set top box directly to a vendor. For example, if a user selects to review an interactive video concerning automotive service provided at a national automotive service shop, the incentive system may then provide a discount for the user at the advertised shop. In that case, set top box 10 transmits a signal through the network connection to indicate that the registered user of the set top box is to receive a discount at the shop. The signal includes a code to identify the user, the date at which the interactive video was reviewed, and the particular product or service that is of interest to the user. If the user takes a vehicle for automotive service at the shop before the expiration of the discount period, the user can redeem the electronic coupon to receive the discount.

In the second embodiment described above, a user reviews television commercial advertisements that are aired during breaks in television programming, and selects to receive further information concerning one or more advertisers after log-off. As a third embodiment of the present invention, the set top box provides a searchable, interactive listing of advertisements for the user to navigate and select before television programming is provided. In this manner, the user can first review one or more interactive videos of television commercials, and then enjoy a pay-per-view television program or movie at a discount.

Figure 5:
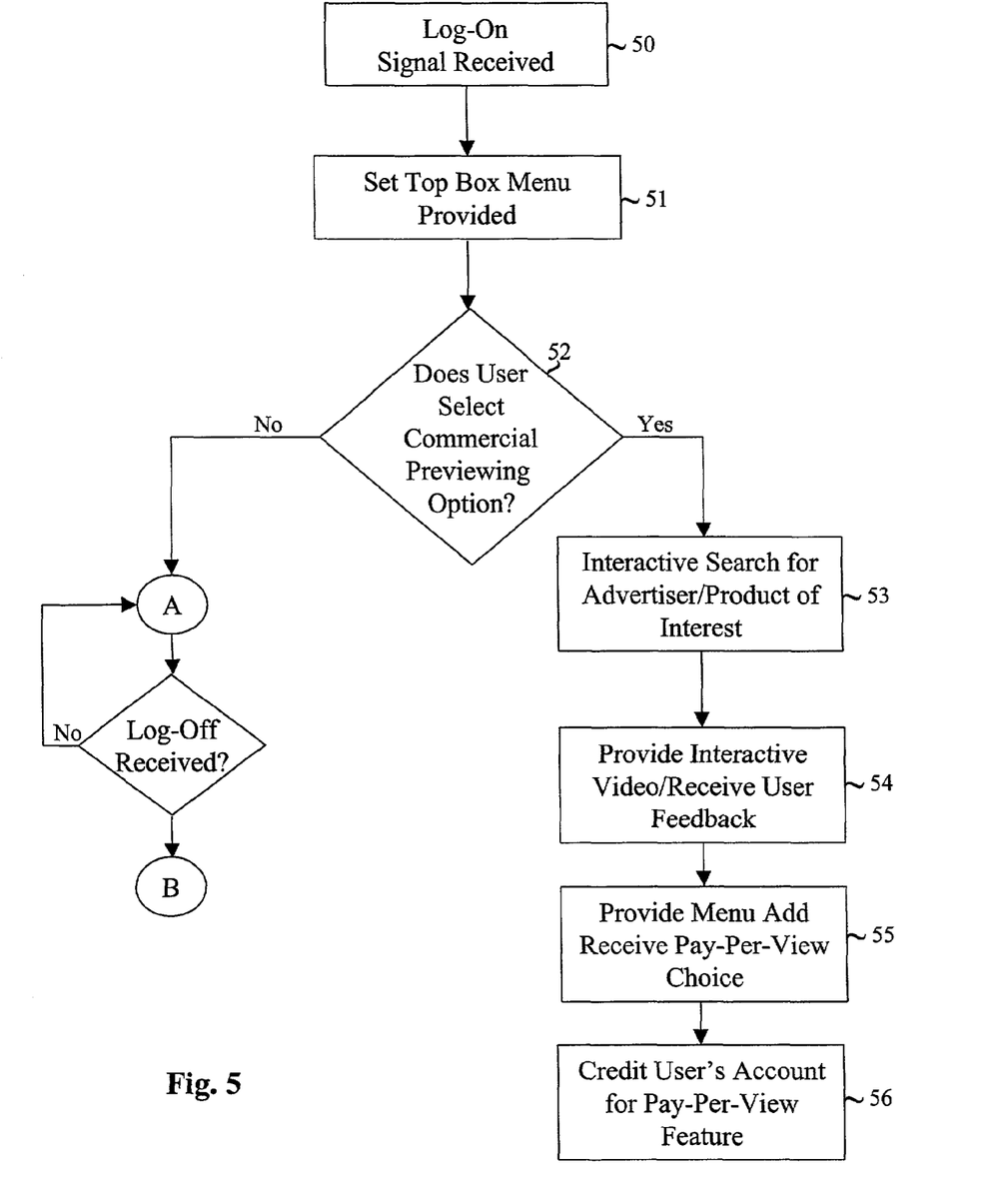
FIG. 5 is a flow diagram for providing questionnaires or interactive videos concerning advertisements of interest to a viewer using the system of FIG. 1 and providing a reduced price pay-per-view television program as a reward.

The third embodiment of the present invention is described in further detail with reference to FIG. 5. In step 50, the user logs-on to the set top box system to begin a session. The user is provided a choice in step 51 concerning whether to watch commercials before ordering a pay-per-view movie/video-on-demand, or to watch normal television programming interspersed with commercials, as described in the first embodiment. If the user selects in step 52 to watch normal television programming, the system proceeds to perform the steps as described in FIGS. 1 and 2, as indicated by "A" and "B", respectively, in FIG. 5. If the user instead selects to preview a commercial, the set top box provides for an interactive search for an advertiser, or an advertiser's product of interest, in step 53. For example, the user may choose "household products," followed by "hair care products," and then select "hair spray products." The system will then select a relevant commercial from an advertiser who has registered with the incentive system service.

The set top box provides the selected commercial for the user to view in step 54. After the user completes viewing the advertisement information, the user will then receive pay-per-view information via the satellite or cable network in the usual course, in step 55. The set top box 10 then transmits a signal to an external network via the network connection 14 to communicate the commercial that was played, and to credit the user's account for a portion of the cost of the per-per-view movie or program to be played.

Accordingly, the method and apparatus of the present invention enables advertisers and networks to provide an incentive for viewers to watch television commercial advertisements. Viewers can also select to learn more information concerning advertised products of interest, thus providing for more effective advertising. Viewers can receive rewards for responding to an advertiser's questionnaires, concerning topics such as the effectiveness of advertisements themselves, or the quality of advertised products. Further, the viewers can receive a reward that is directly related to their viewing activities, such as pay-per-view/video-on-demand. Alternatively, viewers can receive coupons or discounts at advertisers' stores, or for the advertised products that are of interest to the user. Thus, it is readily seen that the method and system of the present invention provides for improved advertising, and can maximize the value of advertising time during breaks in television programming.

The description provided above for inserting locally stored advertisements can also be applied to other forms of media. For example, advertisements can be audio signals for broadcast radio, or can appear on personal digital assistants, cellular or digital wireless telephones, or pagers, in addition to televisions.

The foregoing disclosure of embodiments of the present invention and specific examples illustrating the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claimed appended hereto, and by their equivalents.

What is claimed is:

1. A method for providing an incentive for a viewer to watch commercial advertisements, comprising:
    locally inserting an instruction by a set top box into broadcast programming to generate a prompt during commercial breaks that prompts the viewer to watch commercials;
    receiving selections during the commercials to receive additional information concerning selected commercials;
    receiving a log-off signal to stop the broadcast programming;
    disconnecting a switch in a motion picture expert group decoder to disconnect the broadcast programming;
    retrieving a screen from a database stored in local memory of the set top box;
    displaying a list of sponsors in the screen that are associated with the selected commercials;
    receiving a selection of a sponsor from the list of sponsors;
    navigating products and services offered by the sponsor;
    receiving a product selection offered by the sponsor;
    retrieving a video from the local memory of the set top box associated with the product selection;
    displaying the video; and
    providing the incentive after the video is played.

2. The method according to claim 1, further comprising canceling the selections.

3. The method according to claim 1, further comprising providing a credit.

4. The method according to claim 1, further comprising:
displaying a list of rewards for which the viewer may be eligible;
receiving a reward selection by the viewer; and
awarding a reward to the viewer.

5. The method according to claim 1, further comprising electronically transmitting a discount.

6. A media delivery device providing an incentive to a viewer to watch commercial advertisements, comprising:
a processor executing a program stored in memory that causes the processor to:
locally insert an instruction by the media delivery device into broadcast programming to generate a prompt during commercial breaks that prompts the viewer to watch commercials;
receive selections during the commercials to receive additional information concerning selected commercials;
receive a log-off signal to stop the broadcast programming;
disconnect a switch in a motion picture expert group decoder to disconnect the broadcast programming;
retrieve a screen from a database stored in local memory of the media delivery device;
display a list of sponsors in the screen associated with the selected commercials;
receive a selection of a sponsor from the list of sponsors;
navigate products and services offered by the sponsor;
receive a product selection offered by the sponsor;
retrieve a video from the local memory of the media delivery device associated with the product selection;
display the video; and
provide the incentive after the video is played.

7. The media delivery device according to claim 6, wherein the program further causes the processor to cancel the selections.

8. The media delivery device according to claim 6, wherein the program further causes the processor to display a list of rewards.

9. Memory storing a program that causes a processor to perform a method for providing an incentive for a viewer to watch commercial advertisements, the method comprising:
locally inserting an instruction by a set top box into broadcast programming to generate a prompt during commercial breaks that prompts the viewer to watch commercials;
receiving selections during the commercials to receive additional information concerning selected commercials;
receiving a log-off signal to stop the broadcast programming;
disconnecting a switch in a motion picture expert group decoder to disconnect the broadcast programming;
retrieving a screen from a database stored in local memory of the set top box;
displaying a list of sponsors in the screen associated with the selected commercials;
receiving a selection of a sponsor from the list of sponsors;
navigating products and services offered by the sponsor;
receiving a product selection offered by the sponsor;
retrieving a video from the local memory of the set top box associated with the product selection;
displaying the video; and
providing the incentive after the video is played.

* * * * *